(12) United States Patent
Chen et al.

(10) Patent No.: US 8,576,529 B2
(45) Date of Patent: Nov. 5, 2013

(54) POWER STAGE CONTROL CIRCUIT

(75) Inventors: Yu-Chang Chen, Jiji Township, Nantou County (TW); Pei-Lun Huang, Zhubei (TW); Li-Di Lo, Hsinchu (TW)

(73) Assignee: Richpower Microelectronics Corporation, Grand Cayman (KY)

( * ) Notice: Subject to any disclaimer, the term of this patent is extended or adjusted under 35 U.S.C. 154(b) by 335 days.

(21) Appl. No.: 12/932,617

(22) Filed: Mar. 1, 2011

(65) Prior Publication Data
US 2012/0013367 A1  Jan. 19, 2012

(30) Foreign Application Priority Data
Jul. 16, 2010 (TW) ................................ 99123510 A

(51) Int. Cl.
*H02H 3/08* (2006.01)
(52) U.S. Cl.
USPC ...................................... 361/93.1; 363/21.02
(58) Field of Classification Search
USPC ........... 363/16–20, 1.01, 21.02, 21.11, 21.12, 363/41, 49, 50, 89, 95, 97, 21.15, 21.16; 323/222, 282, 290, 271; 361/18, 44, 361/87, 93.01, 93.02, 94, 98, 101
See application file for complete search history.

(56) References Cited

U.S. PATENT DOCUMENTS

| | | | | |
|---|---|---|---|---|
| 5,245,495 A | * | 9/1993 | Bailey et al. | 361/23 |
| 7,232,733 B2 | * | 6/2007 | Lotfi et al. | 438/332 |
| 7,245,510 B2 | * | 7/2007 | Baurle et al. | 363/21.12 |
| 7,272,025 B2 | * | 9/2007 | Hawley | 363/49 |
| 8,077,483 B2 | * | 12/2011 | Djenguerian et al. | 363/21.01 |
| 8,189,313 B1 | * | 5/2012 | Kraft | 361/93.1 |

* cited by examiner

*Primary Examiner* — Rajnikant Patel
(74) *Attorney, Agent, or Firm* — Tung & Associates

(57) ABSTRACT

The present invention discloses a power stage control circuit including: a driver circuit for controlling a power stage according to an error amplified signal; an error amplifier circuit for comparing a feedback voltage at a feedback terminal with a reference signal to generate the error amplified signal; a current generator circuit coupled to the feedback terminal for generating a fault detection current flowing to the feedback terminal; and a feedback terminal short detection circuit for generating a fault signal to stop the operation of the power stage when the feedback voltage is smaller than a short-circuit threshold voltage or when the fault detection current is larger than a short-circuit threshold current.

17 Claims, 10 Drawing Sheets

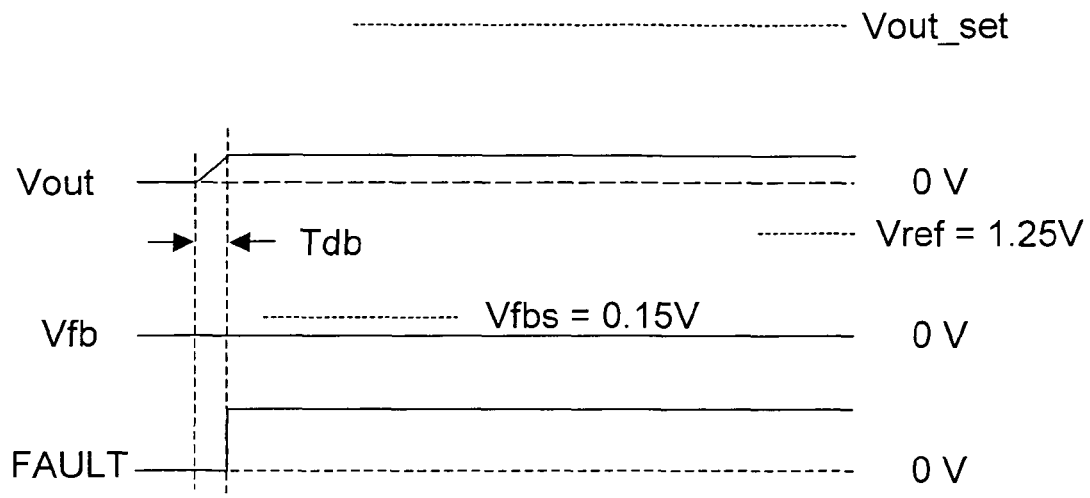
Fig. 11B
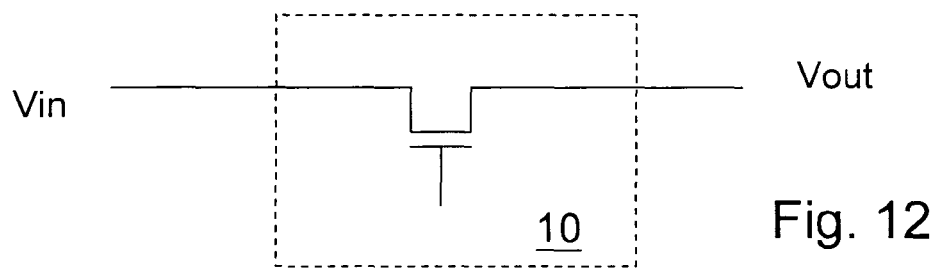
Fig. 12
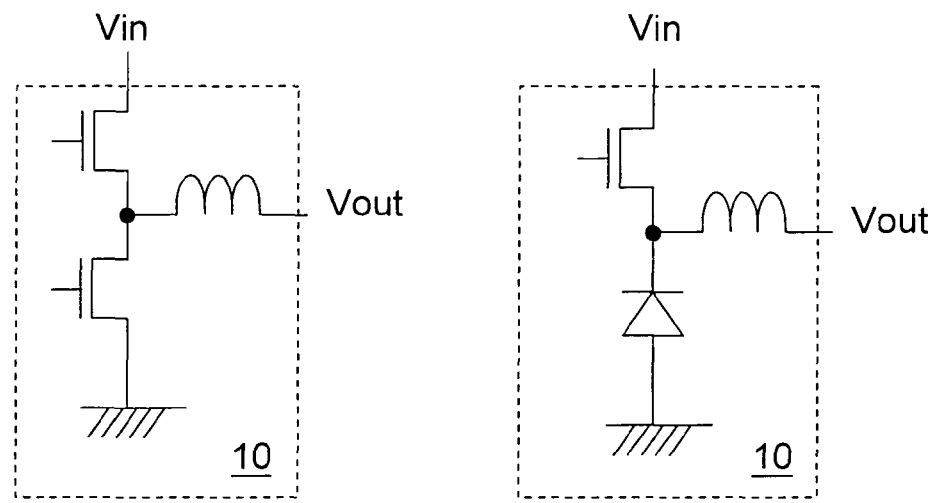
Fig. 13A
Fig. 13B

POWER STAGE CONTROL CIRCUIT

BACKGROUND OF THE INVENTION

1. Field of Invention

The present invention relates to a power stage control circuit; particularly, it relates to a power stage control circuit with feedback terminal short-circuit protection.

2. Description of Related Art

FIG. 1 shows a schematic diagram of a prior art power stage control circuit. As shown in FIG. 1, a power stage 10 converts an input voltage Vin to an output voltage Vout (or to an output current, depending on whether a load circuit requires a stable voltage or a stable current). The output terminal is connected to ground through two resistors Z1 and Z2 connected in series. The resistor Z2 is coupled between a feedback terminal FB of a power stage control circuit 20 and ground. The voltage across the resistor Z2 is the feedback voltage Vfb which is inputted to one input terminal of an error amplifier circuit 22 in the power stage control circuit 20. The error amplifier circuit 22 compares the feedback voltage Vfb with a reference signal Vref, and generates an error amplified signal which is inputted to a driver circuit 21. The driver circuit 21 generates a driver signal according to the error amplified signal, to drive the power stage 10.

When the feedback terminal FB is shorted to ground, the error amplifier circuit 22 will generate an abnormal comparison output, and in response, the driver circuit 21 will generate an abnormal driver signal which will keep driving the power stage 10 to increase the output voltage. This will result in damages to the circuit. To avoid this, the prior art power control circuit 20 includes a comparator circuit 23, whose one input terminal receives the feedback voltage Vfb, and the other input terminal receives a short-circuit threshold voltage Vfbs (for example, the short-circuit threshold voltage Vfbs may be 0.15V). The comparator circuit 23 compares the feedback voltage Vfb with the short-circuit threshold voltage Vfbs; when the feedback voltage Vfb is smaller than the short-circuit threshold voltage Vfbs, it is determined that a short-circuit condition occurs at the feedback terminal FB, and a fault signal is generated to stop the operation of the power stage 10.

However, in the initial stage when the circuit begins to operate, since the power stage 10 has not yet or just started to operate, the output voltage Vout is zero or extremely low. Therefore, the comparison by the comparator circuit 23 in the initial stage is inaccurate and will induce misjudgment of the short-circuit condition at the feedback terminal FB. To avoid such misjudgment, the output of the comparator circuit 23 should be masked during the initial stage. Typically, in the initial stage, a power ON reset (POR) circuit 25 will output a POR signal which is sent to the driver circuit 21 to start a power ON procedure. Thus, a blanking circuit 24 can be provided which is triggered by the POR signal to generate a blanking signal inv_BL, and blanking signal inv_BL is sent to an AND logic gate 26 to mask the output of the comparator circuit 23 as shown in FIG. 1.

FIG. 2A shows the signal waveforms of the circuit shown in FIG. 1 during a normal power ON procedure. When the POR signal is at high level, the power ON procedure starts. Let us assume that the regulation target of the output voltage Vout is Vout_set and its corresponding feedback voltage Vfb is 1.25V, i.e., the reference signal Vref is set to 1.25V, and the short-circuit threshold voltage Vfbs for example may be set to 0.15V. To avoid the misjudgment in the initial stage, the blanking circuit 24 generates the blanking signal inv_BL which delays a blanking period Tbk to ensure that the feedback voltage Vfb has crossed over the predetermined short-circuit threshold voltage Vfbs as it gradually increases from the ground voltage during the initial stage. Only after the blanking signal inv_LB is at high level, the comparison result of the comparator circuit 23 is allowed to pass through the AND logic gate 26 to the driver circuit 21, as an accurate fault signal FAULT.

However, in different applications, the input voltage Vin, the output voltage Vout, and the load condition may be different. This will result in different rising speed of the feedback voltage Vfb, and therefore the blanking period Tbk (i.e. the setting of the blanking signal inv_BL) must be long enough to avoid misjudgment even at minimum input voltage Vin and maximum loading. However, as shown in FIG. 2B, if the input voltage Vin is high and there is no load, short-circuit may occur at the feedback terminal FB before the short-circuit protection mechanism starts to function, causing damages to the circuit. Therefore, it is not a good approach in the prior art power stage control circuit to temporarily disable the short-circuit protection for the feedback terminal FB within the blanking period Tbk during circuit initial stage.

In view of the foregoing, the present invention provides a power stage control circuit with feedback terminal short-circuit protection which does not require setting the blanking period Tbk, such that the short-circuit protection for the feedback terminal does not need to be disabled in the circuit initial stage.

SUMMARY OF THE INVENTION

The objective of the present invention is to provide a power stage control circuit with feedback terminal short-circuit protection, which does not require setting the blanking period Tbk as the prior art.

To achieve the objective mentioned above, the present invention provides a power stage control circuit controlling a power stage, wherein the power stage is driven by a driver signal to convert an input voltage to an output voltage or an output current, the power stage control circuit comprising: a driver circuit for generating the driver signal to drive the power stage according to an error amplified signal; an error amplifier circuit for comparing a feedback voltage at a feedback terminal with a reference signal to generate the error amplified signal; a current generator circuit coupled to the feedback terminal for generating a fault detection current flowing to the feedback terminal; and a feedback terminal short detection circuit for generating a fault signal when the feedback voltage is smaller than a short-circuit threshold voltage, such that the driver circuit stops driving the power stage.

In a preferred embodiment of the power stage control circuit, the current generator circuit includes: a current source for generating the fault detection current flowing to the feedback terminal; and one or more diodes coupled to the current source at a node, whereby a reverse current does not flow from the feedback terminal to the current source. The current generator circuit preferably further includes a voltage clamp circuit for clamping the voltage of the node. The voltage clamp circuit for example includes one of the circuits selected from: a diode, a metal oxide semiconductor transistor, a bipolar junction transistor, a zener diode, or a combination of the above circuits.

In another preferred embodiment, the current generator circuit includes an error amplifier circuit and a transistor, wherein the error amplifier circuit controls a controlled end of the transistor, and the error amplifier circuit compares the voltage of a current outflow end of the transistor with a predetermined clamp voltage to control the transistor for generating the fault detection current.

In another preferred embodiment, the current generator circuit includes a transistor having a controlled end which is controlled by a predetermined clamp voltage plus a turn-ON threshold voltage of the transistor, whereby the transistor generates the fault detection current.

In another preferred embodiment, the feedback terminal short detection circuit includes a comparator circuit for comparing the feedback voltage with the short-circuit threshold voltage, and generating the fault signal according to the comparison result. The feedback terminal short detection circuit may alternatively be an inverter for generating the fault signal when the feedback voltage is zero or close to zero.

In another embodiment, the present invention provides a power stage control circuit controlling a power stage, wherein the power stage is driven by a driver signal to convert an input voltage to an output voltage or an output current, the power stage control circuit comprising: a driver circuit for generating the driver signal to drive the power stage according to an error amplified signal; an error amplifier circuit for comparing a feedback voltage at a feedback terminal with a reference signal to generate the error amplified signal; a current generator circuit coupled to the feedback terminal for generating a fault detection current flowing to the feedback terminal; and a feedback terminal short detection circuit for generating a fault signal when the fault detection current is larger than a short-circuit threshold current, such that the driver circuit stops driving the power stage.

In a preferred embodiment of the power stage control circuit, the aforementioned power stage control circuit preferably further includes a debounce circuit coupled in series between the feedback terminal short detection circuit and the driver circuit, the debounce circuit having a debounce time period in which the fault signal is excluded from inputting to the driver circuit, to filter a noise.

In one preferred embodiment, the power stage control circuit is integrated to an integrated circuit (IC).

The aforementioned power stage may be a linear regulator or a switching regulator.

The objectives, technical details, features, and effects of the present invention will be better understood with regard to the detailed description of the embodiments below.

BRIEF DESCRIPTION OF THE DRAWINGS

FIG. 11B shows the signal waveforms of the embodiments of the present invention wherein short-circuit occurs at the feedback terminal FB during the power ON procedure.

FIG. 12 shows a schematic diagram of a linear power stage.

FIGS. 13A and 13B show schematic diagrams of a buck switching power stage.

DESCRIPTION OF THE PREFERRED EMBODIMENTS

Figure 1:
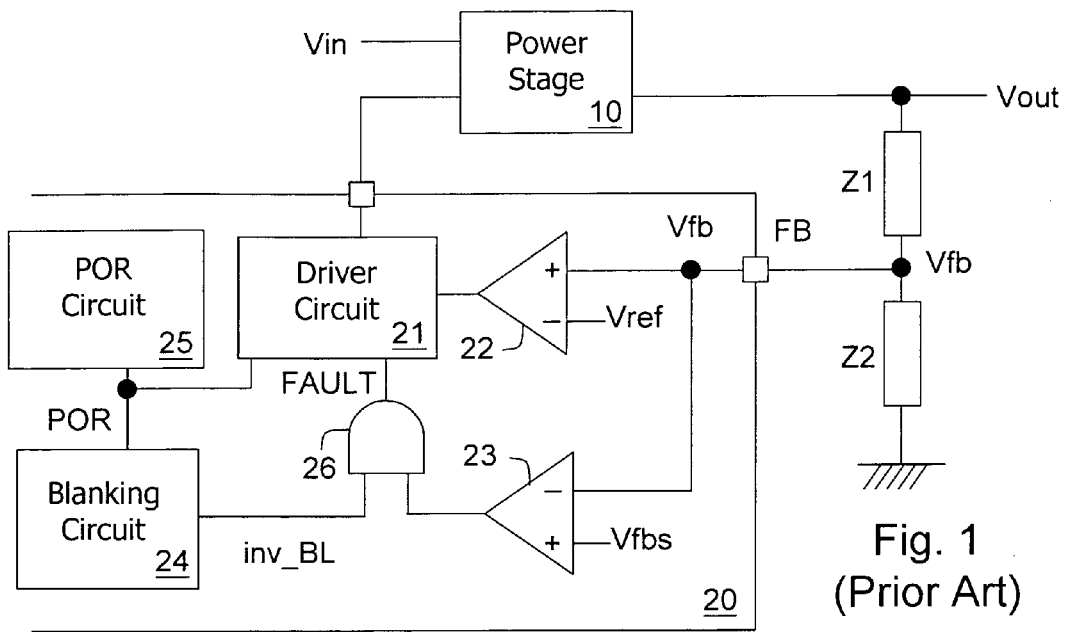
FIG. 1 shows a schematic diagram of a prior art power stage control circuit.
Figure 2A:
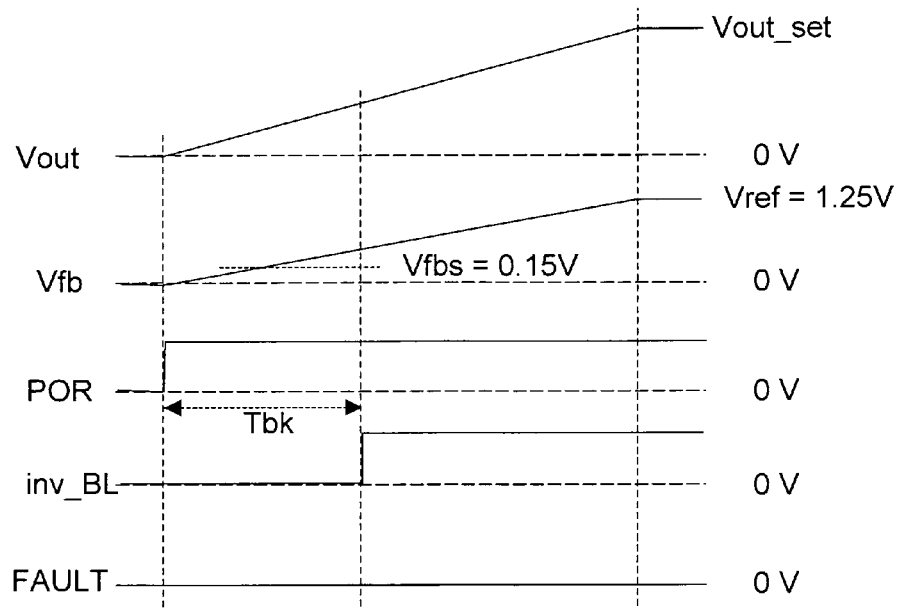
FIG. 2A shows the signal waveforms of the circuit shown in FIG. 1 during a normal power ON procedure.
Figure 2B:
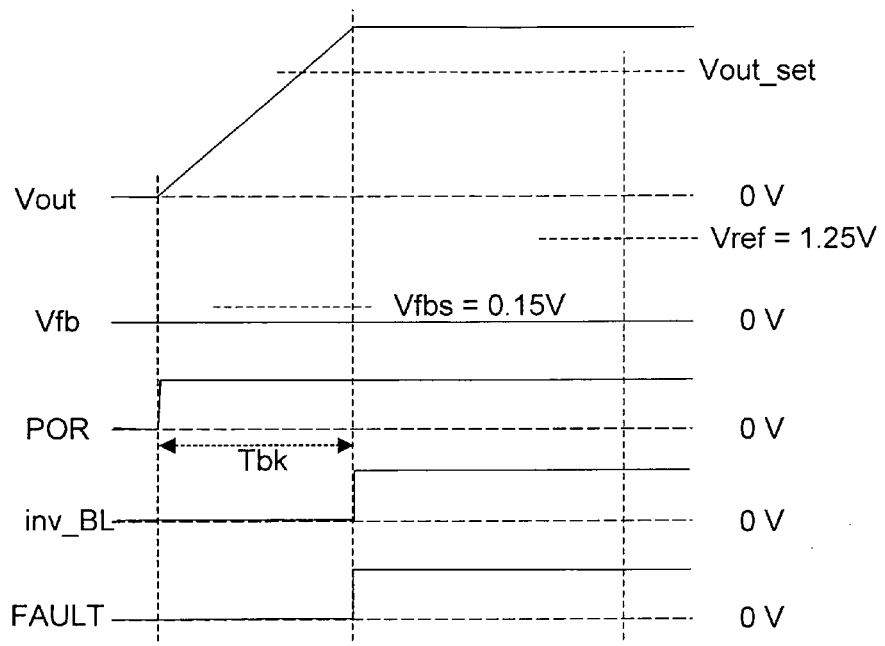
FIG. 2B shows the signal waveforms of the circuit shown in FIG. 1 wherein short-circuit occurs at the feedback terminal FB during the power ON procedure.
Figure 3:
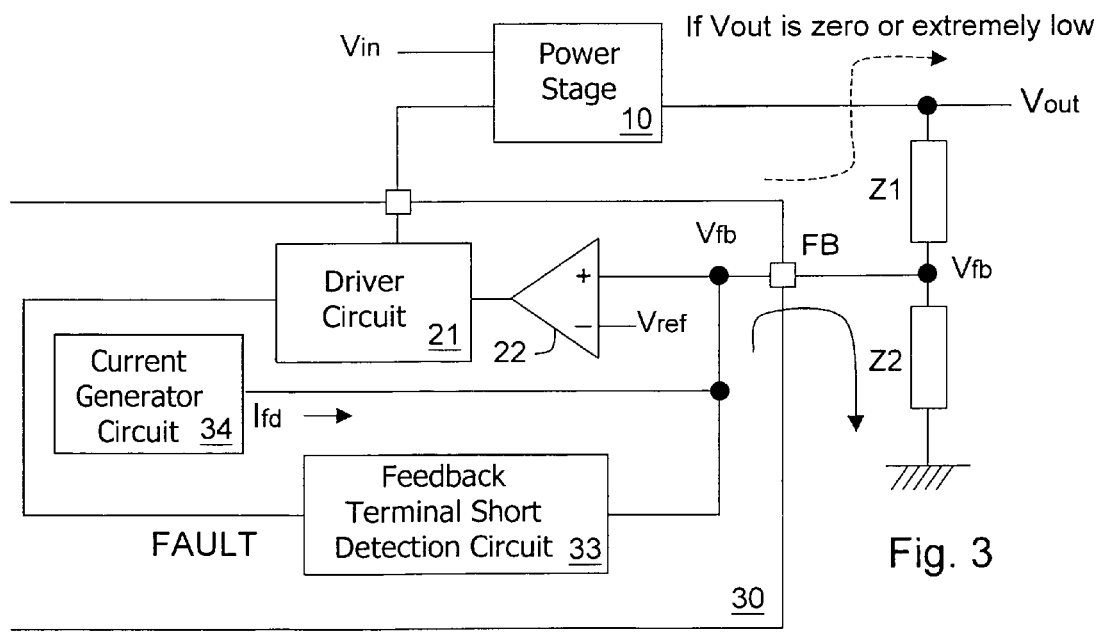
FIG. 3 shows a first embodiment of the present invention.

FIG. 3 shows the first embodiment of the present invention. As shown in the figure, a power stage control circuit 30 includes a driver circuit 21, an error amplifier circuit 22, a feedback terminal short detection circuit 33, and a current generator circuit 34. The driver circuit 21 receives an error amplified signal from the error amplifier circuit 22, and outputs a driver signal to drive the power stage 10. The driver circuit 21 also receives a fault signal FAULT which stops the driver circuit 21 from driving the power stage when the operation of the circuit is abnormal. One of the input terminals of the error amplifier circuit 22 is coupled to the feedback terminal FB for receiving a feedback voltage Vfb, and the other input terminal of the error amplifier circuit 22 receives a reference signal Vref. The error amplifier circuit 22 compares the feedback voltage Vfb with the reference signal Vref, and generates the error amplified signal which is inputted to the driver circuit 21. The feedback voltage Vfb is obtained from a node between resistors Z1 and Z2. As shown in the figure, one end of the resistor Z2 is coupled to ground, and the other end of the resistor Z2 is coupled to one end of the resistor Z1; the other end of the resistor Z1 is coupled to the output terminal. In other words, the resistors Z1 and Z2 form a voltage dividend circuit which samples the output voltage Vout by the resistor Z2. The feedback voltage Vfb is also inputted to the feedback terminal short detection circuit 33 to detect whether a short-circuit condition occurs in the feedback terminal FB. When a short-circuit condition occurs in the feedback terminal FB, the feedback terminal short detection circuit 33 outputs the fault signal FAULT to the driver circuit 21, to stop it from driving the power stage 10.

Instead of providing a blanking period during the circuit initial stage, the present invention uses an entirely different and novel mechanism. As shown in FIG. 3, according to the present invention, the current generator circuit 34 is provided, which is coupled to the feedback terminal FB; the current generator circuit 34 provides a fault detection current Ifd flowing to the feedback terminal FB. The fault detection current Ifd may be constant or variable; when short-circuit occurs at the feedback terminal FB, the fault detection current Ifd is different from the condition wherein the feedback terminal FB is not shorted to ground, or the fault detection current Ifd generates a feedback voltage Vfb which is different from the condition wherein the feedback terminal FB is not shorted to ground, such that the feedback terminal short detection circuit 33 can verify whether short-circuit occurs.

More specifically, the resistance between the feedback terminal FB and the ground has two conditions:

Condition 1: when the feedback terminal FB is shorted to ground, the resistance can be regarded as zero.

Condition 2: when the feedback terminal FB is not shorted to ground and the circuit is in the initial stage, i.e., the output voltage Vout is zero or extremely low, the resistors Z1 and Z2 can be regarded as being connected in parallel between the feedback terminal FB and ground, and the resistance between the feedback terminal FB and ground is the resistance of the resistors Z1 and Z2 in parallel, =Z1*Z2/(Z1+Z2).

From the above, the resistance between the feedback terminal FB and ground is:

resistance (condition 1)<<resistance (condition 2)

Therefore, if a constant fault detection current Ifd is provided, which flows to feedback terminal FB, the voltage at the feedback terminal FB (i.e., the feedback voltage Vfb) is:

Vfb=Ifd*(resistance between feedback terminal FB and ground)

Because Ifd is a constant, the feedback voltage Vfb has a similar relationship to the resistance:

Vfb (condition 1)<<Vfb (condition 2)

In other words, if a proper reference voltage Vfbs is set between Vfb (condition 1) and Vfb (condition 2), the relationship will be:

Vfb (condition 1)<Vfbs<Vfb (condition 2)

Figure 4A:
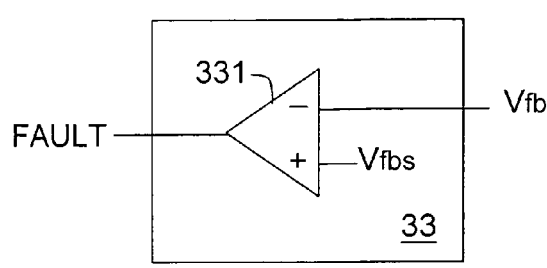
FIGS. 4A and 4B show two embodiments of the feedback terminal short detection circuit 33 of the present invention.

The reference voltage Vfbs is called "short-circuit threshold voltage" hereinafter. By comparing the short-circuit threshold voltage Vfbs with the feedback voltage Vfb, it can be determined if short-circuit occurs at the feedback terminal FB. That is, the feedback terminal short detection circuit 33 shown in FIG. 3 may be embodied by a comparator circuit 331 as shown in FIG. 4A. One input terminal of the comparator circuit 331 is coupled to the feedback terminal FB to receive the feedback voltage Vfb, and the other input terminal of the comparator circuit 331 receives the short-circuit threshold voltage Vfbs. The comparator circuit 331 compares the feedback voltage with the short-circuit threshold voltage Vfbs; the comparison result determines whether to generate the fault signal FAULT.

Figure 4B:
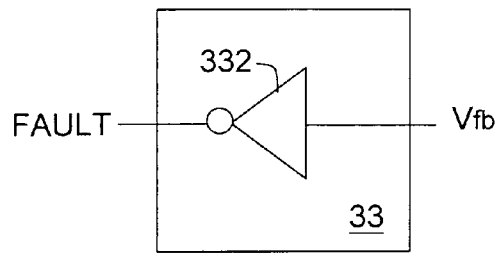

The feedback terminal short detection circuit 33 can be embodied in various other ways, not limited to the comparator circuit 331 shown in FIG. 4A. Because the feedback voltages Vfb of condition 1 and condition 2 are far different, and in condition 1, the feedback voltage Vfb is equal to or close to zero, the feedback terminal short detection circuit 33 can alternatively be embodied as an inverter 332 as shown in FIG. 4B, such that when the voltage at the feedback terminal FB (the feedback voltage Vfb) is zero or close to zero, the fault signal FAULT is generated.

Figure 5A:
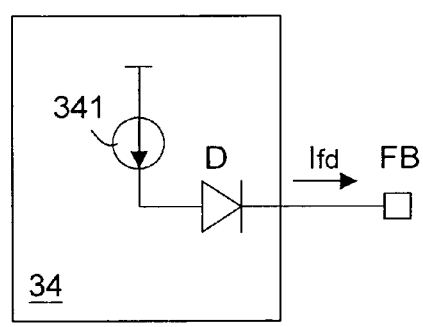
FIGS. 5A-5F show several embodiments of the current generator circuit 34 of the present invention.
Figure 5B:
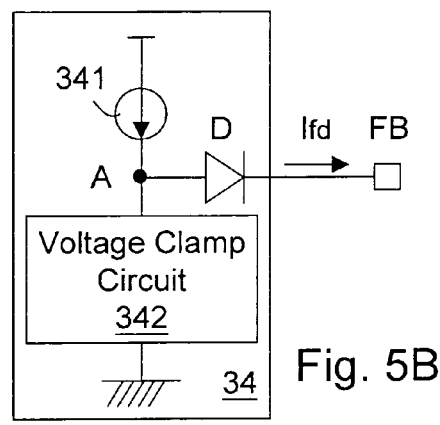
Figure 5C:
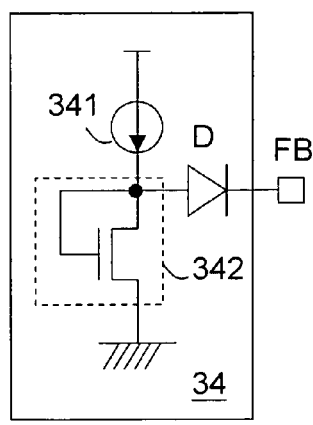
Figure 5D:
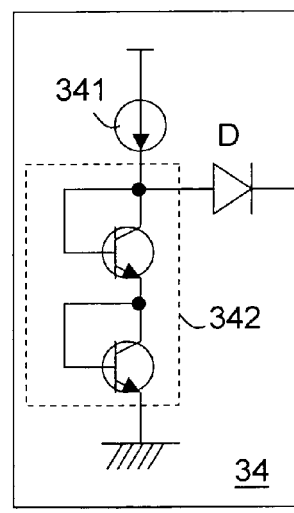
Figure 5E:
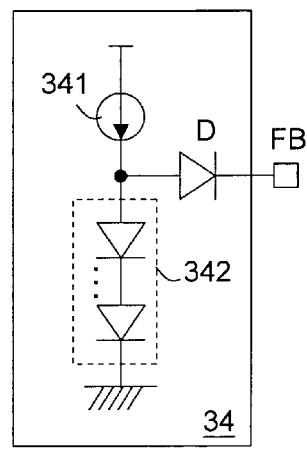
Figure 5F:
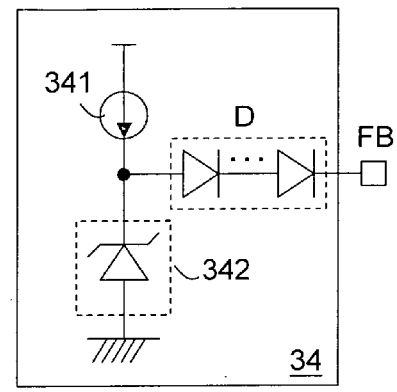

The current generator circuit 34 can be embodied in various ways. The simplest way is to provide a current source 341 as shown in FIG. 5A. To prevent current from flowing from the feedback terminal FB back to the current source 341, it is preferred (but not necessary) that one or more diodes D are provided in the path. In addition to the embodiment shown in FIG. 5A, FIG. 5B shows another preferred embodiment of the present invention. Referring to FIG. 5B, the current generator circuit 34 includes a voltage clamp circuit 342 for clamping the voltage of node A. The reason to provide the voltage clamp circuit 342 is thus. Please refer to FIG. 5B in conjunction with FIG. 3: when the feedback voltage Vfb is close to the reference signal Vref, the error amplifier circuit 22 enters the linear adjustment region. At this condition, if the voltage generated by the current Ifd flowing through the resistor Z2 is too high, the comparison between the feedback voltage Vfb and the reference signal Vref will be influenced, and the error amplifier circuit 22 may output an incorrect signal. Referring back to FIG. 5B, the voltage clamp circuit 342 clamps the voltage of node A. Assuming that the voltage of node A is clamped at (a clamp voltage Vclmp+0.7 V), the current generator circuit 34 will stop generating the fault detection current Ifd once the voltage at the feedback terminal FB (feedback voltage Vfb) is higher than the clamp voltage Vclmp. On the one hand, this can avoid impacting the comparison between the feedback voltage Vfb and the reference signal Vref, and on the other hand, this can decrease power consumption of the circuit. For example, if the reference signal Vref is 1.25V, and the short-circuit threshold voltage Vfbs is 0.15V, the clamp voltage Vclmp may be set to any proper value between the reference signal Vref and the short-circuit threshold voltage Vfbs, such as 0.3V (certainly, the aforementioned values are only examples).

The voltage clamp circuit 342 for example may be, but not limited to, the embodiments shown in FIGS. 5C-5F, or a combination of the circuits shown in FIGS. 5C-5F. To clamp the voltage of the feedback terminal FB at a proper voltage, the number of devices used in the current generator circuit 34 can be modified as required (for example, the number of the bipolar junction transistor(s) or the diode(s) shown in FIGS. 5D-5F can be modified).

In the aforementioned embodiments, the fault detection current Ifd is constant, but according to another embodiment the present invention, the fault detection current Ifd can also be variable. As explained in the above, the resistance between the feedback terminal FB and ground is:

resistance (condition 1)<<resistance (condition 2)

Therefore, if a voltage difference which is substantially constant is provided between the feedback terminal FB and ground, the relationship of the current Ifd which flows from the feedback terminal FB to ground between different conditions will be:

Ifd (condition 1)>>Ifd (condition 2)

In other words, if a reference current Ifbs is set between Ifd (condition 1) and Ifd (condition 2), the relationship will be:

Ifd (condition 1)>Ifbs>Ifd (condition 2)

Figure 6:
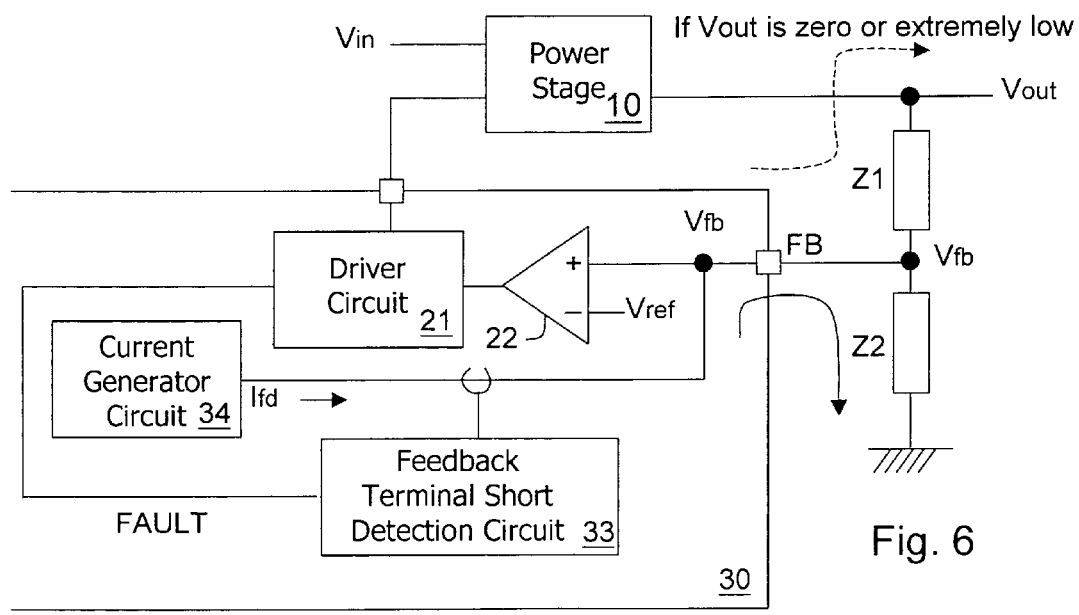
FIG. 6 shows another embodiment of the present invention.
Figure 7:
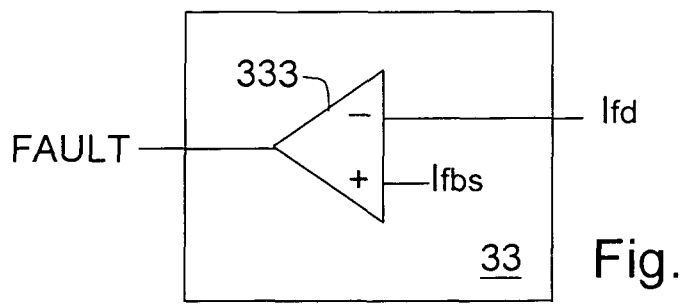
FIG. 7 shows another embodiment of the feedback terminal short detection circuit 33.

By comparing the reference current Ifbs with the current Ifd, it can be determined if short-circuit occurs at the feedback terminal FB; the circuit is shown in FIG. 6. A corresponding feedback terminal short detection circuit 33 is shown in FIG. 7, wherein a current comparator circuit 333 compares the fault detection current Ifd with the reference current Ifbs, and the comparison result determines whether to generate the fault signal FAULT (note that the fault detection current Ifd and the reference current Ifbs in FIG. 7 are shown for easier understanding of the concept. In a real circuit, instead of the fault detection current Ifd and the reference current Ifbs themselves, the current comparator circuit 333 can receive their functions such as fractions converted to voltage values).

The current generator circuit 34 in FIG. 6 for example may be ones as shown in FIG. 8A-8D. First referring to FIG. 8A, the current generator circuit 34 may include an error amplifier circuit 343 and a transistor Q. The error amplifier circuit 343 controls the controlled end of the transistor Q (the gate of a metal oxide semiconductor (MOS) transistor or the base of a bipolar junction transistor (BJT)). The error amplifier circuit 343 compares the voltage of the current outflow end (the source of an N-type MOS transistor or the emitter of the BJT)

with the clamp voltage Vclmp, and the output of the error amplifier circuit 343 controls the transistor Q to generate the fault detection current Ifd. In this embodiment, when the feedback terminal FB is shorted to ground (condition 1) such that the feedback voltage Vfb is zero or close to zero, the fault detection current Ifd is large. On the other hand, when the feedback terminal FB is not shorted to ground, the voltages of the two input terminals of the error amplifier circuit 343 are equal, i.e., the voltage of the source (the current outflow end) of the transistor Q is equal to the clamp voltage Vclmp; the feedback voltage Vfb is clamped at the voltage Vclmp, and thus the fault detection current Ifd is much less than the current in condition 1. Moreover, when the feedback terminal FB is not shorted to ground and the output voltage Vout increases to an extent that the feedback voltage Vfb is larger than the clamp voltage Vclmp, because the voltage of the negative input terminal of the error amplifier circuit 343 is larger than the voltage of its positive terminal, the transistor Q is OFF, and the current generator circuit 34 naturally stops outputting the fault detection current Ifd. On one hand, this can prevent from impacting the comparison between the feedback voltage Vfb and the reference signal Vref, and on the other hand, this can decrease power consumption of the circuit.

To avoid damages to the circuit caused by large fault detection current Ifd when the feedback terminal FB is shorted to ground, an additional current limit circuit can be provided, in connection with the current generator circuit 34 in FIG. 8A (for example, the current limit circuit may provided above or below the transistor Q, connected in series), or the size of the transistor Q can be designed to limit the maximum current.

Figure 8A:
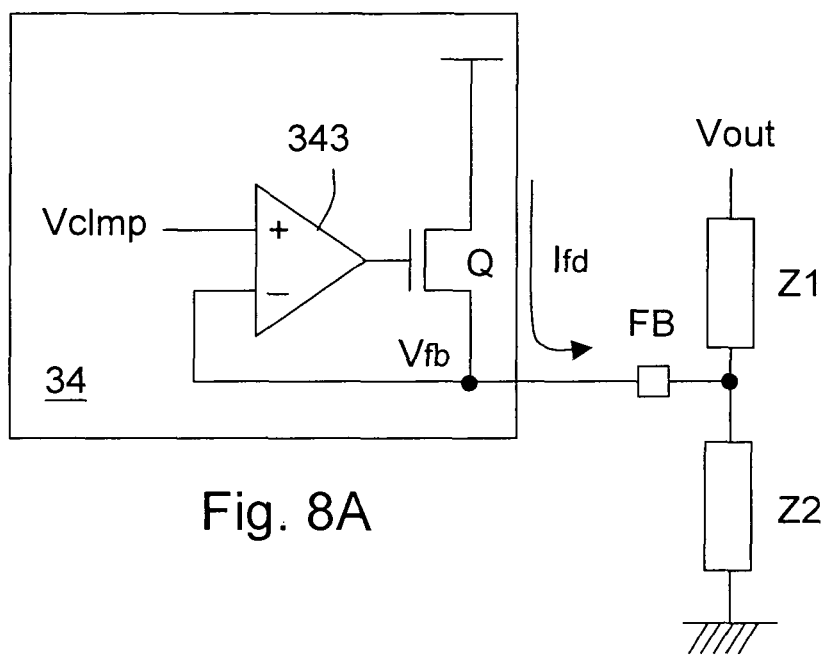
FIGS. 8A-8D show several other embodiments of the current generator circuit 34.
Figure 8B:
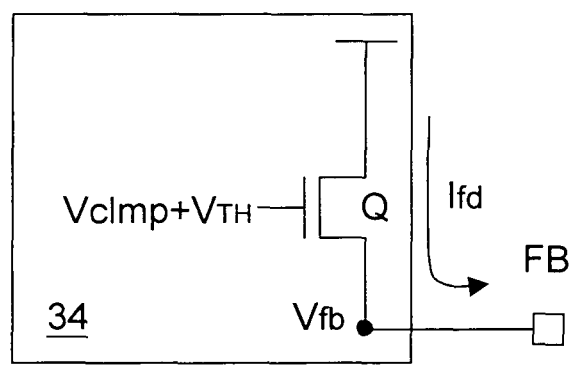

FIG. 8B shows another embodiment of the current generator circuit 34. The current generator circuit 34 in this embodiment includes a transistor Q which has a gate controlled by the voltage Vclmp+VTH, wherein VTH is the turn-ON threshold voltage of the transistor Q. When the feedback terminal FB is shorted to ground (condition 1) such that the feedback voltage Vfb is zero or close to zero, both the gate-to-source and the gate-to-drain voltage differences of the transistor Q are large, the fault detection current Ifd is large. When the feedback terminal FB is not shorted to ground, because the gate-to-source voltage difference of the transistor Q is VTH, the voltage of the source (the current outflow end) of the transistor Q is clamped at voltage Vclmp, and the fault detection current Ifd in this condition is much less than the current in the condition 1. Moreover, when the feedback terminal FB is not shorted to ground and the output voltage Vout increases to an extent that the feedback voltage Vfb is higher than the clamp voltage Vclmp, the transistor Q is OFF, and the current generator circuit 34 naturally stops outputting the current detection current Ifd.

Similar to FIG. 8A, to avoid damages to the circuit caused by large fault detection current Ifd when the feedback terminal FB is shorted to ground, an additional current limit circuit can be provided, in connection with the current generator circuit 34 in FIG. 8B (for example, the current limit circuit may be provided above or below the transistor Q, connected in series), or the size of the transistor Q can be designed to limit the maximum current.

Figure 8C:
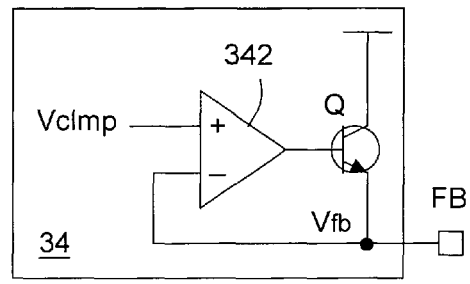
Figure 8D:
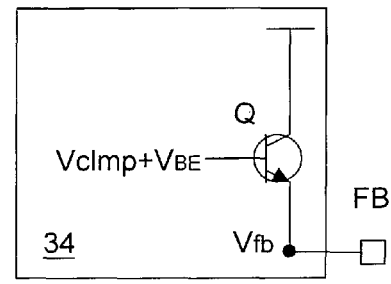

The transistor Q shown in FIGS. 8A-8B is not limited to a MOS transistor; it may be replaced by a BJT as shown in FIGS. 8C-8D. The circuits shown in FIGS. 8C-8D provide similar functions to the circuits of FIGS. 8A-8B, and the details thereof are not redundantly repeated here.

Note that in FIGS. 8A-8D, not only the fault detection current Ifd changes according to whether the feedback terminal FB is shorted or not shorted to ground, so does the feedback voltage Vfb. Therefore, the current generator circuits 34 shown in FIGS. 8A-8D can also be used in the power stage control circuit 30 shown in FIG. 3, in cooperation with the feedback terminal short detection circuits 33 shown in FIGS. 4A-4B; it is not limited to be used in the power stage control circuit 30 of FIG. 6 and in cooperation with the feedback terminal short detection circuit 33 shown in FIG. 7.

Figure 9:
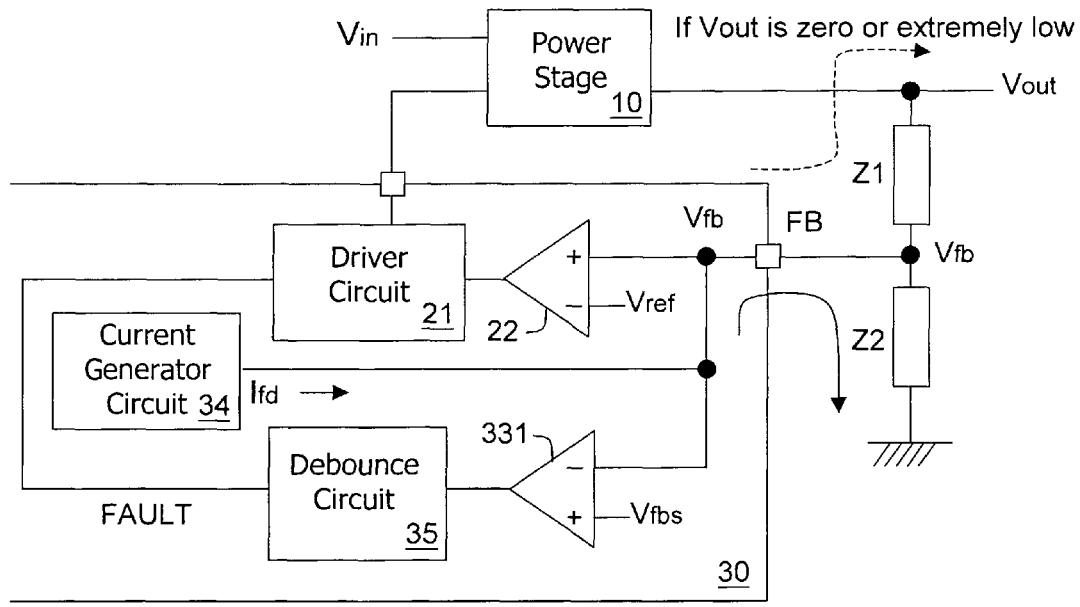
FIG. 9 shows another embodiment of the present invention, wherein a debounce circuit 35 is provided.
Figure 10:
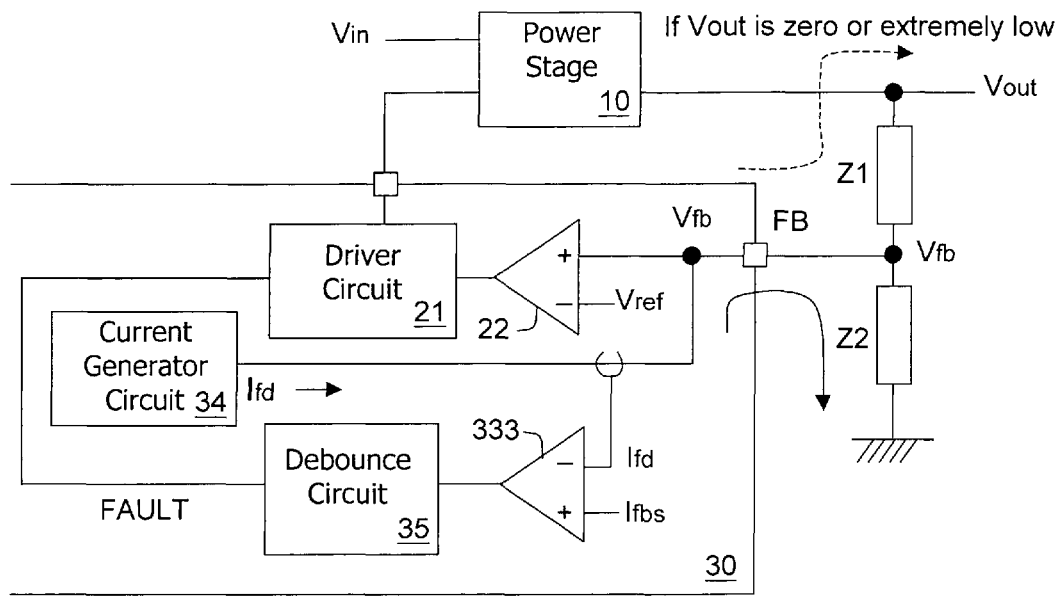
FIG. 10 shows another embodiment of the present invention, which is also provided with the debounce circuit 35.

FIGS. 9-10 show two other embodiments of the present invention. In the embodiments shown in the figures, the feedback terminal short detection circuit 33 is embodied as, but is not limited to be, the comparator circuit 331 or the current comparator circuit 333 (in FIG. 9, the comparator circuit 331 can be replaced by the inverter 332 shown in FIG. 4B). In addition, the embodiments shown in FIGS. 9-10 further include a noise filtering mechanism. The signal generated by the feedback terminal short detection circuit 33 is inputted to a debounce circuit 35, which has a debounce time period during which it excludes the noise of the fault signal FAULT such that the driver circuit 21 does not mis-operate because of the noise. (The function of the debounce circuit 35 is different from the function of the blanking circuit 24 in the prior art. The blanking circuit 24 masks the fault signal FAULT during the initial stage of the circuit when the feedback voltage Vfb has not yet reached a normal operation level. The blanking circuit 24 is only used in the initial stage of the circuit, and a long blanking period Tbk is required. Differently, the debounce circuit 35 always filters the fault signal FAULT irrelevant as to whether the circuit is in the initial stage, and the debounce time period is much shorter than the blanking period Tbk.)

Figure 11A:
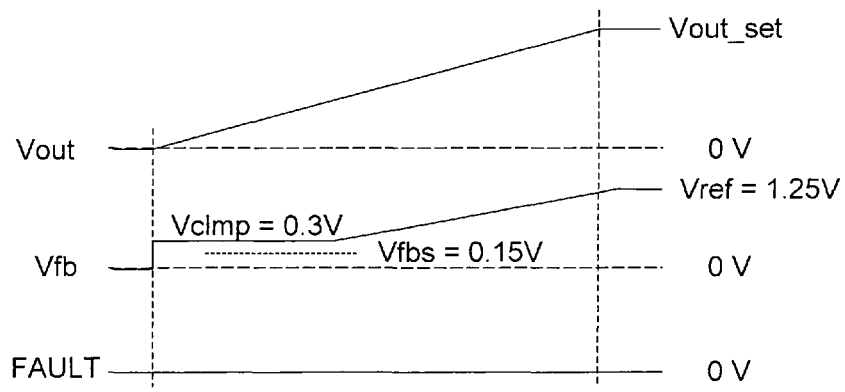
FIG. 11A shows the signal waveforms of the embodiments of the present invention during a normal power ON procedure.

FIG. 11A shows the signal waveforms of circuit according to the present invention in a normal starting operation. For easier understanding and better comparison with the prior art, it is also assumed that the target voltage of the output voltage Vout is Vout_set, and the corresponding feedback voltage Vfb is 1.25V, i.e., the reference signal Vref is 1.25V; the feedback terminal short detection circuit 33 for example uses the comparator circuit 331 shown in FIG. 4A, and the short-circuit threshold voltage Vfbs for example is 0.15V. Certainly, the aforementioned values can be modified according to different conditions. As shown in the figure, in the staring operation, i.e., during the process wherein the output voltage Vout increases from 0 to the target voltage Vout_set, because of the function of the fault detection current Ifd, the feedback voltage Vfb is clamped at the clamp voltage Vclmp until the feedback voltage Vfb is larger than the minimum voltage Vclmp due to the increase of the output voltage Vout. Because the feedback voltage Vfb is larger than the short-circuit threshold voltage Vfbs, the circuit does not generate a high level fault signal FAULT. That is, in the present invention, the starting process in the initial stage does not cause a mis-operation to generate the fault signal FAULT, and therefore the blanking period Tbk is not required.

On the other hand, FIG. 11B shows the signal waveforms of circuit according to the present invention in a starting operation wherein the feedback terminal FB is shorted to ground. When the feedback terminal FB is short to ground, the voltage of the feedback terminal FB is kept at ground level 0V; because the feedback voltage Vfb in the normal starting process is not lower than the short-circuit threshold voltage Vfbs, the condition that the feedback terminal FB is shorted to ground can be determined immediately even though in the starting process at the initial stage, unlike the prior art which requires a blanking period which delays the protection and increases the risk to damage the circuit. If a debounce circuit 35 of FIGS. 9-10 is provided, as shown in the figure, a very short debounce period Tdb will exist, for eliminating noises.

The debounce period Tbd is much shorter than the blanking period Tbk. Therefore, the present invention can determine whether short-circuit occurs at the feedback terminal FB much faster than the prior art.

In the aforementioned embodiments, the power stage control circuit 30 can be integrated into an integrated circuit.

In the aforementioned embodiments, the short-circuit threshold voltage Vfbs is set smaller than the clamp voltage Vclmp, and the clamp voltage Vclmp is set smaller than the reference signal Vref. Such settings are normal, but can certainly be modified as required. For example, the short-circuit threshold voltage Vfbs may be set equal to the clamp voltage Vclmp.

Figure 14A:
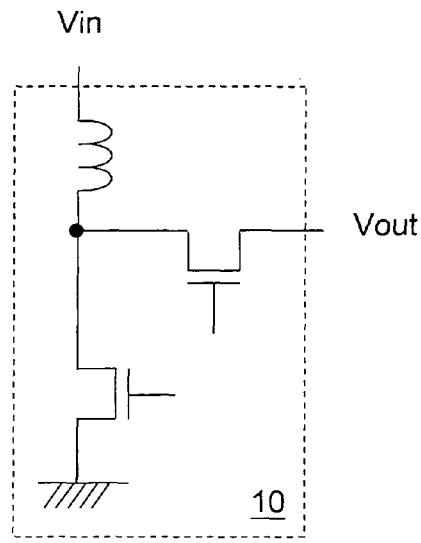
FIGS. 14A and 14B show schematic diagrams of a boost switching power stage.
Figure 14B:
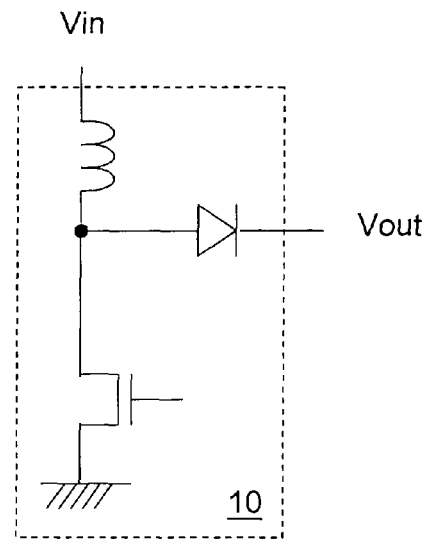
Figure 15A:
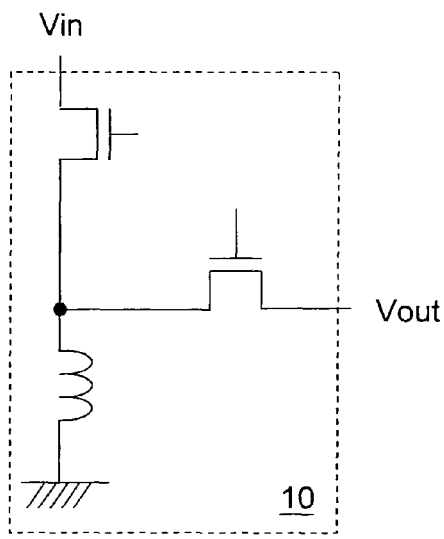
FIGS. 15A and 15B shows schematic diagrams of an inverting switching power stage.
Figure 15B:
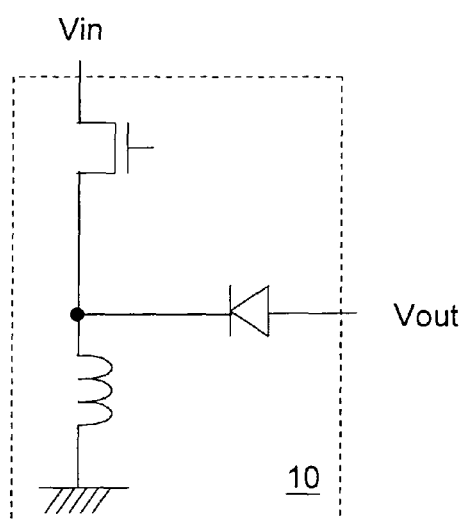
Figure 16A:
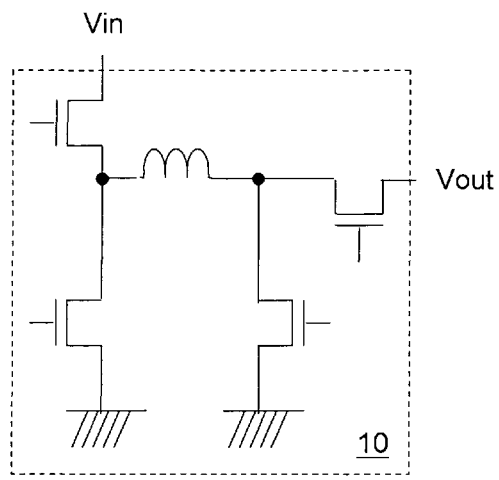
FIGS. 16A and 16B show schematic diagrams of a buck-boost switching power stage.
Figure 16B:
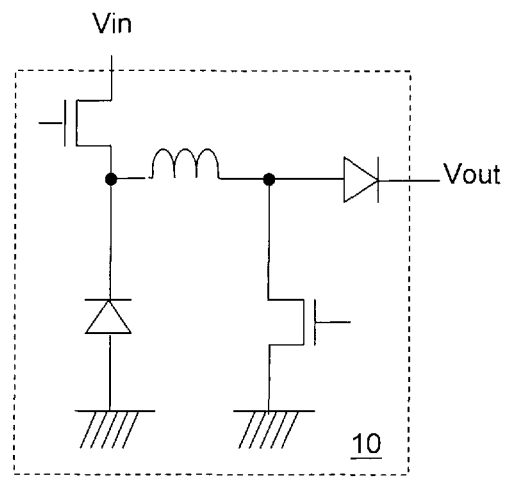
Figure 17A:
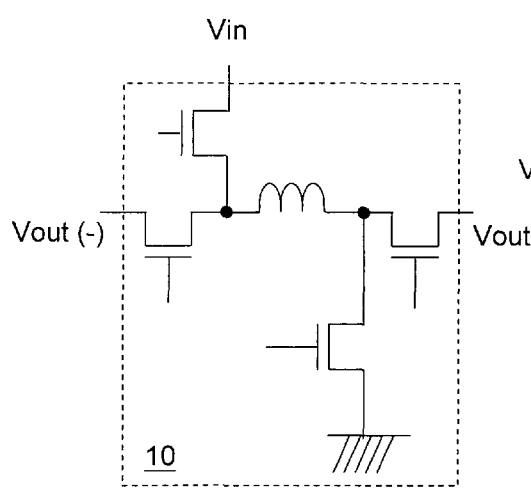
FIGS. 17A and 17B show schematic diagrams of a inverting-boost switching power stage.
Figure 17B:
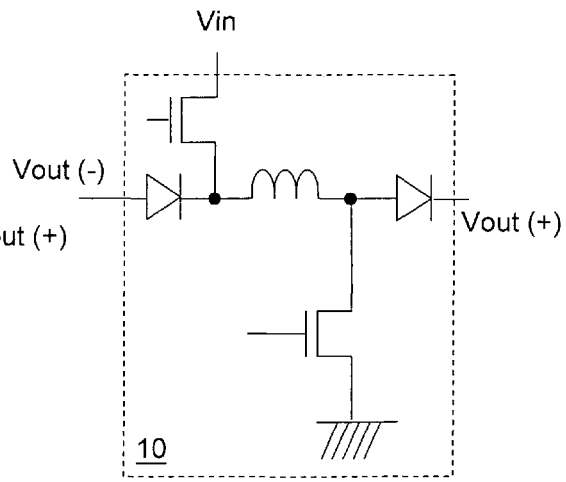

In the aforementioned embodiments, the power stage 10 may be a linear power supply circuit, or a switching regulator. For example, the power stage 10 may be the linear power supply circuit shown in FIG. 12; it may also be a buck switching regulator as shown in FIGS. 13A and 13B, a boost switching regulator as shown in FIGS. 14A and 14B, an inverting switching regulator as shown in FIGS. 15A and 15B, a buck-boost switching regulator as shown in FIGS. 16A and 16B, or an inverting-boost switching regulator as shown in FIGS. 17A and 17B, etc.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments. As another example, the positive and negative input terminals of the comparator circuits and error amplifier circuits are interchangeable. The NMOS transistor can be changed to a PMOS transistor, with corresponding amendments to the circuit processing these signals. As another example, the resistors Z1 and Z2 can be changed to other devices and circuits having proper resistances, etc. In view of the foregoing, the spirit of the present invention should cover all such and other modifications and variations, which should be interpreted to fall within the scope of the following claims and their equivalents.

What is claimed is:

1. A power stage control circuit controlling a power stage, wherein the power stage is driven by a driver signal to convert an input voltage to an output voltage or an output current, the power stage control circuit comprising:
   a driver circuit for generating the driver signal to drive the power stage according to an error amplified signal;
   an error amplifier circuit for comparing a feedback voltage at a feedback terminal with a reference signal to generate the error amplified signal, wherein the feedback terminal is for electrically connecting to the output voltage through a first resistor and electrically connecting to ground through a second resistor;
   a current generator circuit coupled to the feedback terminal for generating a fault detection current flowing out through the feedback terminal such that when the output voltage is zero or low, the first and second resistors form a parallel circuit between the feedback terminal and the ground; and
   a feedback terminal short detection circuit for generating a fault signal when, after the fault detection current is generated, the feedback voltage is smaller than a short-circuit threshold voltage, such that the driver circuit stops driving the power stage.

2. The power stage control circuit of claim 1, wherein the current generator circuit includes a current source for generating the fault detection current flowing to the feedback terminal.

3. The power stage control circuit of claim 2, wherein the current generator circuit further includes one or more diodes coupled to the current source at a node, whereby a reverse current does not flow from the feedback terminal to the current source.

4. The power stage control circuit of claim 3, wherein the current generator circuit further includes a voltage clamp circuit for clamping the voltage of the node.

5. The power stage control circuit of claim 4, wherein the voltage clamp circuit includes one of the circuits selected from: a diode, a metal oxide semiconductor transistor, a bipolar junction transistor, a zener diode, or a combination of the above circuits.

6. The power stage control circuit of claim 1, wherein the current generator circuit includes an error amplifier circuit and a transistor, wherein the error amplifier circuit controls a controlled end of the transistor, and the error amplifier circuit compares the voltage of a current outflow end of the transistor with a predetermined clamp voltage to control the transistor for generating the fault detection current.

7. The power stage control circuit of claim 1, wherein the current generator circuit includes a transistor having a controlled end which is controlled by a predetermined clamp voltage plus a turn-ON threshold voltage of the transistor, whereby the transistor generates the fault detection current.

8. The power stage control circuit of claim 1, wherein the feedback terminal short detection circuit includes a comparator circuit for comparing the feedback voltage with the short-circuit threshold voltage, and generating the fault signal according to the comparison result.

9. The power stage control circuit of claim 1, wherein the feedback terminal short detection circuit includes an inverter for generating the fault signal when the feedback voltage is zero or close to zero.

10. The power stage control circuit of claim 1, further including a debounce circuit coupled between the feedback terminal short detection circuit and the driver circuit in series, the debounce circuit having a debounce time period in which the fault signal is excluded from inputting to the driver circuit, to filter a noise.

11. The power stage control circuit of claim 1, wherein the power stage includes a linear regulator or a switching regulator.

12. A power stage control circuit controlling a power stage, wherein the power stage is driven by a driver signal to convert an input voltage to an output voltage or an output current, the power stage control circuit comprising:
   a driver circuit for generating the driver signal to drive the power stage according to an error amplified signal;
   an error amplifier circuit for comparing a feedback voltage at a feedback terminal with a reference signal to generate the error amplified signal, wherein the feedback terminal is for electrically connecting to the output voltage through a first resistor and electrically connecting to ground through a second resistor;
   a current generator circuit coupled to the feedback terminal for generating a fault detection current flowing out through the feedback terminal such that when the output voltage is zero or low, the first and second resistors form a parallel circuit between the feedback terminal and the ground; and
   a feedback terminal short detection circuit for generating a fault signal when, after the fault detection current is generated, the fault detection current is larger than a short-circuit threshold current, such that the driver circuit stops driving the power stage.

13. The power stage control circuit of claim 12, wherein the current generator circuit includes an error amplifier circuit and a transistor, wherein the error amplifier circuit controls a controlled end of the transistor, and the error amplifier circuit compares the voltage of a current outflow end of the transistor with a predetermined clamp voltage to control the transistor for generating the fault detection current.

14. The power stage control circuit of claim 12, wherein the current generator circuit includes a transistor having a controlled end which is controlled by a predetermined clamp voltage plus a turn-ON threshold voltage of the transistor, whereby the transistor generates the fault detection current.

15. The power stage control circuit of claim 12, wherein the feedback terminal short detection circuit includes a comparator circuit for comparing the fault detection current with the short-circuit threshold current, and generating the fault signal according to the comparison result.

16. The power stage control circuit of claim 12 further including a debounce circuit coupled between the feedback terminal short detection circuit and the driver circuit in series, the debounce circuit having a debounce time period in which the fault signal is excluded from inputting to the driver circuit, to filter a noise in an initial stage.

17. The power stage control circuit of claim 12, wherein the power stage includes a linear regulator or a switching regulator.

\* \* \* \* \*